United States Patent Office 3,629,279
Patented Dec. 21, 1971

3,629,279
4-ARYL-2-IMIDAZOLONE COMPOUNDS
Enos Charles Pesterfield, Jr., Briarcliff Manor, N.Y., assignor to Geigy Chemical Corporation, Greenburgh, N.Y.
No Drawing. Continuation-in-part of application Ser. No. 596,813, Nov. 25, 1966. This application Feb. 3, 1969, Ser. No. 796,165
Int. Cl. C07d 49/34
U.S. Cl. 260—309.6
9 Claims

ABSTRACT OF THE DISCLOSURE 4-aryl-2-imidazolone compounds substituted in the 1-position by lower alkenyl groups or by cyclopropyl (lower)alkyl have anti-inflammatory properties.

DETAILED DISCLOSURE

This application is a continuation-in-part of my application Ser. No. 596,813, filed Nov. 25, 1966, now abandoned.

This invention relates to certain novel 4-aryl-2-imidazolone derivatives, to processes for their manufacture, and to their uses. These compounds have valuable pharmacological properties and are useful as pharmaceutical agents.

More particularly, this invention relates to substituted 4-aryl - 2 - imidazolone compounds having the following general formula:

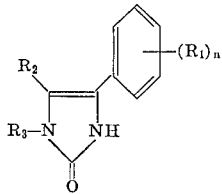

in which $R_1$ represents lower alkyl, halogen, such as fluorine, chlorine or bromine; hydroxy; nitro; amino; cyano; and lower alkoxy, such as methoxy and ethoxy,
$R_2$ represents hydrogen or lower alkyl,
$R_3$ represents lower alkenyl or cyclopropyl (lower)alkyl, and
$n$ is an integer from 0 to 3.

In compounds of the above formula, $R_2$ is preferably hydrogen or methyl, but may also be ethyl, n-propyl, isopropyl, tert-butyl, n-butyl, sec-butyl, n-hexyl, etc.

The groups contemplated for $R_3$ include vinyl, allyl, methallyl, cyclopropylmethyl, etc.

The term "lower" as used herein in connection with definitions of substituents, signifies that the groups in question have from 1 to 6 carbon atoms and are inclusive of straight chains and branched chains.

The compounds of this invention generally exhibit lower toxicity than compounds with analogous structures having hydrogen or alkyl in the 4-position and phenyl, in the 5-position ($R_2$ in the general formula).

These compounds can be prepared by condensation of 1-phenyl - 1 - hydroxyimino - 2 - alkanone with formaldehyde and a suitable amine. These alkanones are either commercially available or can be prepared by methods well known in the art, such as those described below.

More specifically, the condensation reaction can be represented graphically as follows:

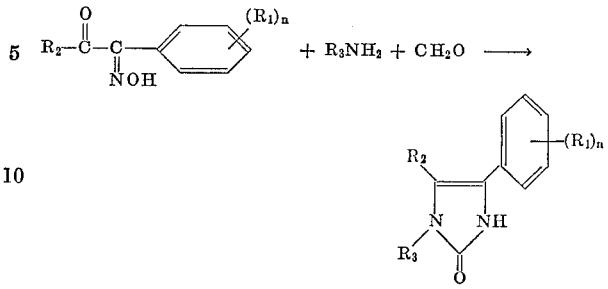

The alkanone compound can be prepared either by direct isonitrosation of the corresponding ketone

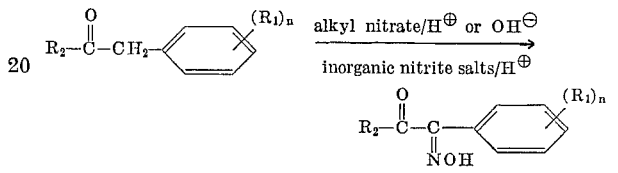

or by condensation of a hydroxyimino ketone with a suitable aryl diazonium halide.

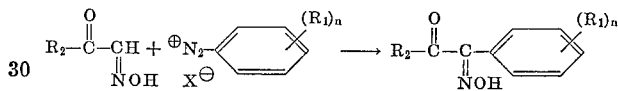

In all these formulae, $R_1$, $R_2$, $R_3$ and $n$ stand for the groups and integers indicated in the general formula above, and X stands for halogen, such as chlorine and bromine.

This synthesis may be described in greater detail as follows: The primary amine and an aqueous solution of formaldehyde or paraformaldehyde are dissolved in a suitable reaction medium, e.g. water, lower alkanols, benzene, etc. To this solution is added the alkanone compound and the reaction mixture is stirred or refluxed with heating. The stirring or refluxing may be continued for up to 18 to 24 hours or longer if desired. The mixture is then cooled and the reaction product worked up and purified in accordance with well known procedures.

Alternatively, the products of this invention may be prepared by condensation of a 1-phenyl-1-amino-2-alkanone acid salt with an isocyanate ester in the presence of a base. This condensation is represented graphically as follows:

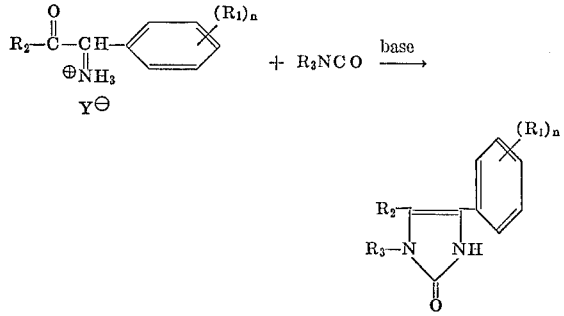

wherein $R_1$, $R_2$, $R_3$ and $n$ stand for the groups and integers indicated in the general formula above, and Y stands for an anion such as a halide (e.g. chloride, bromide), sulfate, borate, etc. The required amino-alkanone acid salt may be prepared by a number of well-known methods, including catalytic hydrogenation of the corresponding 1-phenyl-1-hydroxyimino-2-alkanone in the presence of acid.

As another alternative, a suitably substituted amino ketone ketal may be used as a starting compound and the products of this invention obtained upon (1) condensation with an isocyanate ester followed by (2) acid catalyzed hydrolysis, (3) ring closure, and (4) dehydration. This reaction may be graphically represented as follows:

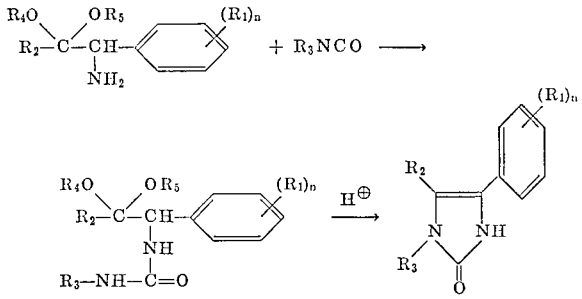

wherein $R_1$, $R_2$, $R_3$ and $n$ stand for the groups or integers indicated in the general formula above, $R_4$ and $R_5$ represent lower alkyl, and $R_4$ and $R_5$ taken together represent alkylene with 2 or 3 carbon atoms. This method is especially useful where $R_2$ is hydrogen.

It is to be understood that any manipulative modifications which are possible in the practice of the subject processes are within the ambit of this invention.

The present invention comprehends not only the above-described derivatives of 2-imidazolone in their free base form, but it also includes pharmaceutically acceptable non-toxic acid addition salts which may be formed from these compounds were they possess functional groups which are conducive to the formation of such salts, in accordance with conventional practice, by using appropriate inorganic and organic acids, such as hydrohalic acids (especially hydrochloric and hydrobromic) sulfuric and phosphoric acids as well as acetic, lactic, succinic, malic, aconitic, aminoacetic, phthalic and tartaric acids.

As indicated above, the compounds of this invention have valuable pharmacological properties. They possess anti-inflammatory activity and are therefore of value in mitigating the symptoms associated with rheumatic arthritic and other inflammatory conditions.

These new compounds and the methods for their preparation may be exemplified more fully in the following illustrative examples. The scope of the invention is, however, not limited thereto. Temperatures are given in degrees centigrade.

Example I.—1-allyl-5-methyl-4-phenyl-2-imidazolone

α-Hydroxyimino-α-phenylacetone (8.7 g.) was added to a solution of aqueous formaldehyde (4.35 ml., 37%) and allylamine (2.42 ml.) in ethanol (100 ml.) and the mixture was heated at reflux for 18 hours, then cooled and concentrated under reduced pressure. The residue was triturated with ethyl acetate. The precipitate was collected and was washed with a little ethyl acetate to give white crystals, 4.3 g., M.P. 174–185°. Several recrystallizations from ethyl acetate gave 1 - allyl - 4 - phenyl-5-methyl-2-imidazolone as white needles, M.P. 175.5–177.5°.

$\lambda_{max.}^{EtOH}$ 286 m$\mu$ ($\epsilon$12,900)

*Analysis.*—Calc. for $C_{13}H_{14}N_2O$ (percent): C, 72.87; H, 6.57; N, 13.08. Found (percent): C, 73.08; H, 6.77; N, 12.82.

Example II.—1-allyl-5-ethyl-4-phenyl-2-imidazolone 1-phenyl-2-butanone (29.6 g.) was added to an ice-cold solution of iso-amyl nitrite (23.4 g.) and sodium ethoxide (from 4.6 g. of Na) in ethanol (92 ml.). The reaction mixture was stirred at room temperature for 2 days. The reaction mixture was then diluted with water (200 ml.) and washed with benzene (6 × 75 ml.). The aqueous portion was saturated with $CO_2$ and the precipitated product collected and washed with water. Recrystallization from water afforded 1-hydroxyimino-1-phenyl-2-butanone as almost colorless platelets, M.P. 148.5–149.5°.

A solution of 1-hydroxyimino - 1 - phenyl-2-butanone (15.0 g.) in ethanol (250 ml.) was added dropwise to a hot solution of allyl amine (4.83 g.) and aqueous formaldehyde (6.9 ml., 37%) in ethanol (250 ml.), then the reaction mixture was refluxed for 18 hours. The cooled reaction mixture was concentrated under reduced pressure and the crystalline residue was taken up in hot ethyl acetate (500 ml.). The resulting solution was filtered and the filtrate was concentrated to about 75 ml. and cooled. The deposited white crystals were collected and dried; yield 8.1 g., M.P. 127–131°. Recrystallization from ethyl acetate afforded 1-allyl-5-ethyl-4-phenyl-2-imidazolone as white crystals, M.P. 124.8–126.8°.

$\lambda_{max.}^{CH_3OH}$ 283.7 m$\mu$ ($\epsilon$, 12,500)

*Analysis.*—Calc. for $C_{14}H_{16}N_2O$ (percent): C, 73.65; H, 7.06; N, 12.27. Found (percent): C, 73.69; H, 7.35; N, 12.11.

Example III.—1-cyclopropylmethyl-5-ethyl-4-phenyl-2-imidazolone

Aqueous sodium hydroxide (83.5 ml., 1 N) was added dropwise to a hot (65–70°) solution of 1-phenyl-1-hydroxyimino-2-butanone (15.0 g.), aminomethylcyclopropane hydrochloride (9.05 g.) and aqueous formaldehyde (6.9 ml., 37%) in ethanol (500 ml.). When the addition was complete, the reaction mixture was refluxed for 18 hours. The cooled reaction mixture was concentrated under reduced pressure. The residue was taken up in hot ethyl acetate, filtered, and the filtrate was concentrated to one-half volume and cooled. The pale yellow crystalline product (14.1 g., M.P. 133–143°) was chromatographed on a silicon dioxide adsorbent (Anisil type B). Elution with chloroform-ethanol (9:1) gave a white crystalline product, 3.9 g., M.P. 150–162°, which after several recrystallizations from ethyl acetate afforded the 1-cyclopropylmethyl-5-ethyl - 4 - phenyl-2-imidazolone as large white prisms, 3.0 g., M.P. 164–166.5°.

$\lambda_{max.}^{CH_3OH}$ 286 m$\mu$ ($\epsilon$, 12,450)

*Analysis.*—Calc. for $C_{15}H_{18}N_2O$ (percent): C, 74.35; H, 7.49; N, 11.56. Found (percent): C, 74.43; H, 7.46; N, 11.33.

Example IV.—1-allyl-4-phenyl-2-imidazolone

A solution of allyl isocyanate (2.5 ml.) in dry benzene (25 ml.) was added dropwise to a stirred solution of α-amino-α-phenylacetaldehyde dimethyl acetal (5.0 g.) in dry benzene. The reaction mixture was stirred at ambient temperature for 30 minutes, then at reflux for 1 hour. The cooled reaction mixture was concentrated under reduced pressure to a clear oil. The oil was treated with aqueous sulfuric acid (6 N, 100 ml.) on the steam bath with vigorous shaking and the formed white solid was collected and washed well with water. Recrystallization from ethyl acetate gave 1-allyl-4-phenyl-2-imidazolone as white needles, 2.8 g., M.P. 166.5–169°.

$\lambda_{max.}^{CH_3OH}$ 286 m$\mu$ ($\epsilon$, 15,450)

*Analysis.*—Calc. for $C_{12}H_{12}N_2O$ (percent): C, 71.99; H, 6.04; N, 13.99. Found (percent): C, 72.07; H, 6.42; N, 13.98.

Example V.—1-allyl-5-methyl-4-(p-nitrophenyl)-2-imidazolone

A mixture of 1-(p-nitrophenyl)-1-hydroxyimino-2-propanone (35.7 g.), allyl amine (14.7 ml.) and aqueous formaldehyde (28 ml., 37%) in ethanol (350 ml.) was refluxed for 18 hours. Upon cooling, the reaction mixture deposited yellow-orange crystals, 39.0 g., M.P. 291–292° (dec.). Recrystallization from methanol in a hot extractor gave the imidazolone as bright orange needles, M.P. 291.5° (dec.).

*Analysis.*—Calc. for $C_{13}H_{13}N_3O_3$ (percent) C, 60.22; H, 5.06; N, 16.22. Found (percent): C, 60.52; H, 5.21; N, 16.33.

Example VI.—1-allyl-5-methyl-4-(p-methoxyphenyl)-2-imidazolone

An aqueous solution of p-methoxyphenyl diazonium chloride (from p-anisidine, 24.6 g.) which had been neutralized to Congo red with sodium acetate (22 g. of the trihydrate) was added below the surface of a solution of hydroxyiminoacetone (20 g.), sodium acetate (134 g.), cupric sulfate (5 g.), and sodium sulfite (0.8 g.) in water (140 ml.) which had been cooled to 10°. After the addition was complete and the reaction mixture had been stirred at room temperature for an additional hour, the precipitate was collected and washed well with water. The precipitate was then taken up in hot sodium hydroxide (1 N), treated with charcoal, filtered, and the hot filtrate was acidified with glacial acetic acid. The precipitate obtained upon cooling the solution was recrystallized from water to give 1-(p-methoxyphenyl)-1-hydroxyimino-2-propanone as light yellow needles, M.P. 147–147.5°.

A mixture of 1-(p-methoxyphenyl)-1-hydroxyimino-2-propanone (2.0 g.), allyl amine (0.8 ml.) and aqueous formaldehyde (3 ml., 37%) in ethanol (50 ml.) was refluxed for overnight. The hot solution was diluted to the cloud-point with water and cooled to 0°. The precipitated tar was filtered off and the filtrate was well extracted with $CHCl_3$. The organic extracts were washed with dilute HCl, then saturated $NaHCO_3$ then dried $(Na_2SO_4)$ and finally were concentrated under reduced pressure. The residue, upon recrystallization from ethyl acetate, deposited cream colored crystals, 550 mg., M.P. 154–158°. Recrystallization from aqueous ethanol gave the imidazolone as white needles, M.P. 156.6–158.5°.

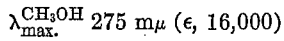

*Analysis.*—Calc. for $C_{14}H_1N_2O_2$ (percent): C, 68.82; H, 6.60; N, 11.47. Found (percent): C, 69.06; H, 6.31; N, 11.27.

Example VII.—1-allyl-4-(p-chlorophenyl-5-methyl-2-imidazolone

A mixture of 1-(p-chlorophenyl) - 1 - hydroxyimino-2-propane (7.9 g.) and 5% Pd/C (50% $H_2O$ wet) in ethanol (95 ml.) with ethanolic HCl (15.8 ml. of 11.67 N) was shaken under $H_2$ at 23° and 739 mm. Hg. The uptake ceased after 2010 ml. of $H_2$. Water (51 ml.) was added to the reaction mixture and the catalyst was separated by filtration. The filtrate was concentrated under reduced pressure and the residue was recrystallized from ethanol/ether at −20° to give the 1-amino-1-(4-chlorophenyl)-2-propanone hydrochloride as an orange powder, 6.6 g., M.P. 200° (dec.).

1-amino-1-(4 - chlorophenyl-2-propanone hydrochloride (3.6 g.) was added portion-wise to a stirred solution of allyl isocyanate (1.8 g.) in dry pyridine (25 ml.). After the addition was complete, and an additional 15 minutes at room temperature, the reaction mixture was heated on a steam bath for 80 minutes. The cooled reaction mixture was diluted with water (60 ml.) and the white crystalline material (2.3 g.) which separated out was collected. This was recrystallized from ethyl acetate to give the imidazolone as white needles, M.P. 196–197.5°.

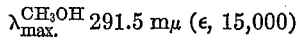

*Analysis.*—Calcd. for $C_{13}H_{13}ClNO_2$ (percent): C, 62.78; H, 5.27; Cl, 14.26; N, 11.26. Found (percent): C, 62.54; H, 5.36; Cl, 14.50; N, 11.90.

As previously noted, the novel compounds of this invention have generally lower toxocity than analogous compounds in which $R_2$ would represent phenyl and in which there would be hydrogen or an alkyl group in the 4-position, i.e. those compounds in which 4- and 5-substituents are "reversed." To illustrate this lower toxicity level, 1-allyl-5-methyl - 4 - phenyl-2-imidazolone (compound of Example I) was compared with 1-allyl-5-phenyl-4-methyl-2-imidazolone (disclosed in U.S. Pat. No. 3,303,199).

Groups of six mice were given single doses of each compound per os and were then observed for a 48-hour period for toxic signs. At a dose of 500 mg./kg. two of the six mice dosed with 1-allyl-5-phenyl-4-methyl-2-imidazolone died within the observation period. At a dose of 1250 mg./kg., this compound killed all six of the test animals. In contrast, 1-allyl-4-phenyl-5-methyl-2-imidazolone, a compound of the instant invention, caused *no* deaths at the 1250 mg./kg. level in the mice.

I claim:

1. A compound of the formula

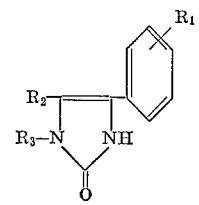

in which $R_1$ is fluorine, chlorine, bromine, hydroxy, nitro, amino, or lower alkoxy, $R_2$ is hydrogen or lower alkyl, and $R_3$ is lower alkenyl or cyclopropyl(lower)alkyl.

2. A compound according to claim 1 which is 1-allyl-5-methyl-4-(p-nitrophenyl)-2-imidazolone.

3. A compound according to claim 1 which is 1-allyl-5-methyl-4-(p-methoxyphenyl)-2-imidazolone.

4. A compound according to claim 1 which is 1-allyl-4-(p-chlorophenyl)-5-methyl-2-imidazolone.

5. A compound of the formula

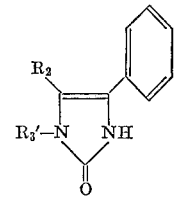

in which $R_2$ is hydrogen or lower alkyl, and $R_3'$ is allyl or cyclopropyl(lower)alkyl.

6. A compound according to claim 5 which is 1-allyl-4-phenyl-2-imidazolone.

7. A compound according to claim 5 which is 1-allyl-5-methyl-4-phenyl-2-imidazolone.

8. A compound according to claim 5 which is 1-allyl-5-ethyl-4-phenyl-2-imidazolone.

9. A compound according to claim 5 which is 1-cyclopropylmethyl-5-ethyl-4-phenyl-2-imidazolone.

References Cited

UNITED STATES PATENTS 3,303,199   2/1967   Doebel et al. _____ 260—309.6

NATALIE TROUSOF, Primary Examiner

U.S. Cl. X.R.

260—465 D, 465 E, 553 A, 566 R, 566 D, 570.5, 999